3,132,094
ULTRAFILTRATION OF ELECTROLYTE SOLUTIONS THROUGH ION-EXCHANGE MEMBRANES
James G. McKelvey, Jr., Indiana, and Kurt S. Spiegler, Pittsburgh, Pa., assignors to Gulf Research & Development Company, Pittsburgh, Pa., a corporation of Delaware
No Drawing. Filed Sept. 11, 1958, Ser. No. 760,308
12 Claims. (Cl. 210—23)

This invention relates to deionization of solutions containing electrolytes, and more particularly to the separation of ions from solutions containing relatively large proportions of electrolytes by ultrafiltration through ion-exchange membranes having certain herein-defined characteristics.

Much is known about the separation of the components of solutions by ultrafiltration through dense, nonionic membranes where the solute and solvent molecules differ substantially in size. In such separation processes the membranes act somewhat as mechanical "sieves," filtering out the larger molecules and permitting passage of smaller molecules. However, these separation processes obviously are not adapted for ultrafiltration of solutions of electrolytes of low molecular weight, such as aqueous solutions of common salts. In such instances the molecular sizes of the solvent and solute are of comparable orders of magnitude, and any membrane that will permit solvent physically to pass through its pores will also permit passage of solute. Nevertheless, it has been shown that salts can be filtered from solutions containing the same by filtering the solutions under pressure through ion-exchange membranes, that is, membranes that contain both fixed and exchangeable ions. However, previous attempts to filter salt solutions with ion-exchange membranes have met only with limited success, especially when the solutions contained fairly substantial proportions of salts. For example, no filtration of solutions containing a starting salt concentration greater than 0.1 normal using an ion-exchange membrane has been reported in which desalting in excess of 10 percent has been obtained. Since some of the more important potential practical applications of salt filtration would involve filtering salt solutions of greater concentration than 0.1 normal, for example, ordinary sea water, the previous failures to achieve efficient deionization of relatively strong electrolyte solutions with ion-exchange membranes have constituted a serious detriment to the practical application of the process.

The present invention relates to an improved process for deionization of electrolyte solutions by ultrafiltration through an ion-exchange membrane, whereby improved, efficient separation of ionic materials from solvent is obtained, even in instances of solutions containing relatively large proportions of electrolytes. We have found that such improved deionization can be obtained by contacting a solution containing electrolyte with one surface of an ion-exchange membrane having an exchange capacity (milliequivalents per gram wet membrane): specific hydraulic permeability (cm.$^2$sec.$^{-1}$dekabar$^{-1}$) ratio of at least $3\times10^8$, to $1\times10^{10}$, preferably $5\times10^8$ to $8\times10^9$, and establishing a pressure differential between the surface of the membrane contacted by the solution and another surface of the membrane sufficient to force solvent through the membrane. Normally the pressure differential will be in the range of 75 to 15,000 p.s.i., and usually it will be between 500 to 5,000 p.s.i., preferably 500 to 2,000 p.s.i., but greater pressure differentials can be used. Although the principles of this invention are applicable to either cation- or anion-exchange type membranes, regardless of the type of electrolyte involved, we have found that especially good results are obtained in filtering dilute solutions by the use of anion-exchange membranes, where the electrolyte in the solution to be filtered involves a polyvalent cation and an anion of lower valence, and that especially good results are obtained with cation-exchange membranes where the electrolyte involves a polyvalent anion and cation of lower valence. We normally prefer to employ homogeneous ion-exchange membranes having exchange capacities greater than 0.3 milliequivalent per gram wet weight, preferably between 0.5 and 2.0 milliequivalents per gram, and having specific hydraulic permeabilities in the range of about $5\times10^{-11}$ to $5\times10^{-8}$ cm.$^2$ per second per dekabar, preferably $1\times10^{-10}$ to $2\times10^{-8}$ cm.$^2$ per second per dekabar, but membranes having other exchange capacities and other specific hydraulic permeabilities, including heterogeneous membranes, can be used, provided the ratio of exchange capacity to specific hydraulic permeability is as defined above. Specific examples of membranes having the properties described are membranes cast from a solution of a mixture of a major proportion of a polyvinyl chloride-acrylonitrile copolymer and a minor proportion of a polymer of 1-vinyl-3-methyl-imidazolium iodide (anion exchange), and membranes cast from a common solution of a major proportion of a polyvinyl chloride-acrylonitrile copolymer and a minor proportion of polystyrene sulfonic acid (cation exchange), but other membranes can be used. The method of this invention will produce superior results with solutions containing low concentrations of electrolytes, but it is especially valuable for filtering electrolyte solutions of a strength between 0.1 normal and 2.0 normal, or even higher, for example, approaching the solubility limit of the electrolyte.

Like the relatively low-efficiency salt filtration processes heretofore carried out, the present invention apparently functions in accordance with the well-known laws of Donnan equilibria. However, unlike the salt filtrations heretofore carried out, we have obtained excellent desalting efficiency, even with solutions containing relatively large proportions of electrolyte. The salt filtering efficiency of our process is considered partially attributable to the relatively large number of fixed charges in membranes used therein. Although this more or less follows from the Donnan theory, the fact that the excellent results obtained by the herein described method are not solely attributable to the number of fixed charges in the membrane is shown by the fact that membranes having exchange capacities several times greater than those of preferred membranes disclosed herein have been found to possess as poor salt filtering characteristics as membranes having no exchange capacity at all. The success of our salt filtration method is thought to be also partly attributable to the use of membranes possessing a very small pore size (that is, a low specific hydraulic permeability). Apparently in membranes having pores of relatively small diameter, the fixed charges that exert the ion-exclusion effect are positioned closer to the center of the pores, where the rate of flow of liquid through the pores is greatest. For this reason the fixed charges are apparently able to exert an unusually strong exclusion effect. However, any suggestion that the pore size of the membrane alone might be the sole index of desalting efficiency is negatived by the fact that various ion-exchange membranes having low specific hydraulic permeabilities have been found to possess relatively poor salt filtering characteristics. Thus, although both of the factors discussed above in combination are considered to affect the salt filtering characteristics of the membrane, neither factor individually will produce a membrane having good salt filtering characteristics. Moreover, the effect of both factors in combination is greater than might be expected from the effect of the factors individually. Thus, we have found that good electrolyte filtering characteristics are obtained when the ratio of fixed charges (of which the exchange capacity is a measure) to pore diameter (of which specific hydraulic permeability is a measure) in the membranes is regulated and/or selected in accordance with the principles disclosed herein, and the present invention in its broader aspects is based on this discovery. We have also found that still further improved results will be obtained by further selection of membranes having these general characteristics in accordance with the nature of the electrolyte solution filtered.

Any ion-exchange membrane having a ratio of exchange capacity to specific hydraulic permeability of the orders of magnitude disclosed herein can be used, regardless of the chemical nature or ionic type of the membrane. Thus, we have found that various membranes having exchange capacity:specific hydraulic permeability ratios greater than $3 \times 10^8$ produce good electrolyte filtration. We prefer to employ membranes having an exchange capacity:specific hydraulic permeability ratios greater than $5 \times 10^8$, preferably $5 \times 10^8$ to $8 \times 10^8$, for solutions of common electrolytes and concentrations up to the limits of their solubility at normal atmospheric temperatures, as such membranes possess excellent salt filtering characteristics and as dilute electrolyte solutions of up to say, 1.0 normal strength can be filtered at favorable rates using moderate pressure differentials. Although membranes having greater ratios can be used, no significant advantage as regards filtration efficiency will normally be obtained by the use of membranes having an exchange capacity:specific hydraulic permeability ratios in excess of $1 \times 10^{10}$. Membranes having exchange capacity:specific hydraulic permeability ratios greater than $1 \times 10^{10}$ may sometimes be used to advantage with hot saturated electrolyte solutions, although relatively greater pressure differentials may be required to obtain practical filtration rates in such instances.

The absolute exchange capacities and specific hydraulic permeabilities of the membranes that are useful in this invention can be any that will produce an exchange capacity:specific hydraulic permeability ratio in the range indicated above. For example, good results will be obtained when the exchange capacity of the membrane is 0.3 meq./g. or greater, but outstanding results have been obtained when the exchange capacity is 0.5 meq./g. or greater, e.g., in the range of 0.5 to 2 meq./g. Similarly, membranes having specific hydraulic permeabilities of $5 \times 10^{-8}$ cm.$^2$ per second per dekabar or less will produce good results. For example, exceptional results have been obtained with membranes whose specific hydraulic permeabilities are in the range of $1 \times 10^{-10}$ to $2 \times 10^{-8}$ cm.$^2$ per second per dekabar.

The membranes useful for the purposes of this invention can be of any suitable chemical composition and electrical type. Homogeneous membranes are preferred but the use of heterogeneous membranes is included by the invention. Especially good results are obtained when the active or ion-exchange resin component, i.e., the polyelectrolyte, and the film-forming resin component of the membrane (which may be the same as or different from that of the polyelectrolyte) are polymeric structures derived from monomers having the generic structure: $CH_2=C<$, but other chemical types of membranes can be used. By way of example, excellent results can be obtained with physically homogeneous membranes cast from a mutual solution of a major amount of an electrolytically inert matrix resin, for example a polyvinyl chloride-acrylonitrile copolymer, and a minor amount of a cation-exchange polyelectrolyte such as polystyrene sulfonic acid, or a minor amount of an anion-exchange polyelectrolyte, such as a polymer of 1-vinyl-3-methyl-imidazolium iodide or chloride, in a common solvent for both materials such as dimethylformamide, dimethylsulfoxide, or a solvent mixture of cyclohexanone and methanol. Especially good results will be obtained when the matrix copolymer is composed of 30 to 50 percent acrylonitrile and 70 to 50 percent polyvinyl chloride, when the polyelectrolyte to matrix weight ratio is in the range of about 1:1 to 1:15, and when the solvent is dimethylformamide. Since, as indicated, the factors that are important for the purposes of this invention are not restricted to membranes of any particular chemical or electrical type, membranes other than those disclosed above can be used. Examples of other membranes are those cast from common solutions of a major amount of polyvinyl chloride-acrylonitrile copolymer and a minor amount of a vinyl methyl ether-maleic anhydride copolymer, or a minor amount of poly-2-vinyl-N-methyl pyridinium bromide, or polyacrylic acid or polymethacrylic acids. Still other membranes include physically and chemically homogeneous membranes such as those formed by copolymerization of styrene sulfonic acid and 1 to 12 percent divinylbenzene, and methacrylic acid and 1 to 12 percent divinylbenzene. Still other membranes whose use is included by this invention are sulfonated polyethylene, polyvinyl chloride, and poly-vinylidene chloride films, and films cast from common solutions of a major proportion of polyethylene and a minor proportion of polystyrene sulfonic acid, or a minor amount of a polyvinyl quaternary ammonium resin, such as those described above.

As has been stated, the principles of the herein disclosed invention are applicable to both cation-exchange and anion-exchange type membranes. Of course, as will be readily apparent to those skilled in the art, for greater efficiency the type of membrane chosen in any given electrolyte filtration should be one in which the fixed ions of the membrane do not exhibit substantial selectivity for any of the ions in the solution being filtered. In the case of strong-base or strong-acid anion- or cation-exchange membranes, we prefer that the membranes be employed in a form in which the exchangeable ions are of the same kind as the ions of the corresponding charge in the solution to be filtered. Thus, when filtering a sodium chloride solution using a cation-exchange membrane, we prefer that the membrane be in the sodium form. When an anion-exchange membrane is used, we prefer that the membrane be in the chloride form. This is by no means essential, however, as filtration of a sodium chloride solution through a strong-base anion-exchange membrane in the hydroxyl form for example, or a strong-acid cation-exchange membrane in the hydrogen form, for example, will convert the exchangeable ions to the chloride or sodium form, respectively, by exchanging the ions in the solution for the dissociable ions in the membrane. In the case of a weak-base or weak-acid anion- or cation-exchange membrane, the membrane should be employed in a form in which the exchangeable ions are highly ionizable or highly dissociable. Thus, the type of membrane, as determined by the sign of the charge of the fixed and exchangeable ions, and the form of the membrane, as determined by the nature of the exchangeable ions, should be such that the fixed, or insoluble ions of the membrane are not selective for, that is do not selectively attract, either ions in the solution of opposite charge, or the exchangeable ions of the membrane. As a convenient index of suitability, both the type and form of the membrane will be suitable to produce good electrolyte filtration if, upon equilibration of the membrane with the electrolyte solution to be filtered, the ratio of the electrolyte to solvent inside the membrane is not greater than 30 percent of the same ratio in the solution outside the membrane. In most instances, good filtration also will be obtained, that is, the type and form of the membrane will be suitable, when the membrane is one whose conductivity remains large, e.g., greater than about 150, preferably 300 to 20,000, millimhos per cm.$^2$ per mil of membrane thickness as determined in 1000 p.p.m. NaCl solution, at 30° C., throughout the filtration process.

Although as stated above, it is possible to filter electrolyte solutions using either anion-exchange or cation-exchange membranes, we have found that unusually good deionization is obtained with anion-exchange membranes in dilute solutions, i.e., less than 1.0 N, when the electrolyte to be filtered involves a polyvalent cation and an anion of lesser valency. Conversely, when the anion is polyvalent and the cation of lesser valency, the best filtration of dilute solutions is obtained with cation-exchange membranes. Thus, good results are obtained by filtering 0.5 N calcium chloride solution through a quaternary ammonium type membrane in the chloride form, and similarly good results will be obtained by filtering a 0.5 N solution of $Na_2SO_4$ through a sulfonic acid type membrane in the sodium form. This difference in efficiency of filtration for electrolytes of different types can be used to advantage in separating different electrolytes in solution from each other. Thus, $CaCl_2$ can be at least partially separated from NaCl in dilute solution by filtration through an anion-exchange membrane.

Any pressure differential that is sufficient to force solvent through the membrane can be used. From thermodynamic considerations only, it appears that the minimum pressure to filter a 0.1 normal solution of sodium chloride at 100 percent salt filtering efficiency is about 75 p.s.i. The minimum theoretical pressure required increases with increasing concentration of the electrolyte solution. Thus, the minimum theoretical pressure to filter a 1.0 normal solution of sodium chloride with 100 percent salt filtering efficiency is about 700 p.s.i. Within the limits of these considerations we prefer to employ relatively high pressures, usually in the range of 500 to 5,000 p.s.i., on account of the relatively low rate of filtration that ordinarily prevails when very low pressure differentials are used. Of course, much higher pressures, for example up to 15,000 p.s.i. can be used provided the membrane is not ruptured, but in no case should the pressure differential be so great that the specific hydraulic permeability of the membrane is reduced to the extent that an impractical rate of filtration results.

In view of the relatively high pressure differential employed in our process, and in view of the relatively delicate structure of the membranes, the membranes must normally be provided with some sort of liquid-permeable, mechanical support during the filtration. By way of example good results can be obtained with sintered metal or porous ceramic supports.

The pressure differential across the ion-exchange membranes employed in the herein disclosed process can be established mechanically, as by means of a piston-cylinder arrangement, or it can be established indirectly by the use of a previously compressed inert gas. In its broader aspects, the invention includes any means of establishing the necessary pressure differential. For example, a hollow structure such as a steel pipe of substantial diameter and provided across the opening at its lower end with a suitably supported membrane of the type disclosed herein might be submerged beneath the surface of the ocean to a depth sufficient to provide the desired pressure differential across the membrane. Filtered water could then be withdrawn from the low-pressure side of the membrane as it accumulated, for example, by means of a float-controlled positive displacement pump positioned at the lower end of the submerged pipe.

We have demonstrated the utility of the herein disclosed process in an apparatus involving an electrolyte reservoir and a two-part membrane holding means having a high pressure side including an electrolyte chamber that was positioned above the test membrane and a low pressure side that was positioned below the membrane. The upper and lower portions of the membrane holding means was formed from two blocks of steel-clad Lucite. The upper portion of the membrane holder was provided with a recess in its lower face comprising the electrolyte chamber. This chamber was provided with an inlet and an outlet, which in turn were connected respectively with the lower and upper portions of the electrolyte reservoir by means of separate conduits. A heating jacket was placed around the outlet conduit and a cooling jacket was placed around the inlet conduit to provide convective circulation of the electrolyte solution from the reservoir over the high-pressure side of the test membrane. The lower, or low-pressure portion of the membrane holding means contained a recess adapted to receive the high-pressure portion of the membrane holding means. A still deeper but smaller, centrally positioned recess was provided in the upper face of the lower portion of the membrane holder to receive a porous membrane support of similar size and shape, in this case a circular, microporous porcelain filter having an area of 20.4 $cm.^2$ and having a maximum pore radius of 4.4 microns. Inasmuch as Lucite is a well-known electrical insulator, it will be obvious that the recesses on the high and low pressure sides of the membrane holding means, that is, the recesses on the high and low pressure sides of the membrane, are electrically insulated from one another. A conduit, integral with the lower portion of the membrane holding means, i.e., drilled in the Lucite, was connected to the porous membrane support recess and was used to withdraw filtered solvent from the low pressure side of the membrane chamber. The electrolyte reservoir was of steel, the interior surfaces of which were electrically insulated by means of a phenolformaldehyde type Bakelite resin coating. In carrying out the tests, the porous filter was placed in its recess and the membrane to be tested was placed over the filter. A rubber gasket was then placed over the membrane and the upper portion of the membrane holding means was placed on top of the gasket. The two parts of the membrane holder were then tightly clamped together with $\frac{5}{8}$ inch steel bolts. The electrolyte reservoir was filled to about 2 inches from the top with about 500 milliliters of the electrolyte solution to be filtered. The pressure differential was established from the upper side of the membrane to the lower side of the membrane by means of nitrogen gas under pressure. Since the compressed nitrogen dissolves readily in the electrolyte solution, a gas barrier or seal was required to separate the two. In some of the experiments a layer of oleic acid was floated on the upper surface of the electrolyte solution to act as the gas seal. In the other experiments a small pressure vessel containing a movable piston was attached to the top of the electrolyte reservoir. In these experiments the movable piston acted as the gas barrier. The last-described gas barrier was employed in Examples IV, V, and VI of the Table A, infra. The pressure in the experiments was measured with a 0–2000 p.s.i. "Bourdon" type gauge, and controlled by means of a 0–3000 p.s.i. pressure regulator.

Two different membranes were employed in these experiments. The first, hereinafter referred to as membrane 1, was manufactured by the National Aluminate Corporation under the name Nalfilm-2. This membrane was transparent, homogeneous, and of the quaternary ammonium or strong-base, anion-exchange type. Spectral analysis of the membrane indicates the presence of vinyl chloride and nitrile, thought to be present in the form of a copolymer of vinyl chloride and acrylonitrile. The membrane was tested for sulfur, chlorine and nitrogen and found to contain the last two elements, but not sulfur. The membrane also had the following characteristics:

Wet thickness, mils _____ 3.5
Resistance, in 0.15 N KCl, ohm-$cm.^2$_____ 20–25
Permselectivity, 0.1/0.2 N KCl, percent_____ 96
Conductance, in 1000 p.p.m. NaCl, millimhos/$cm.^2$ _____ 51
Transport number, of Na+ in 0.3 N NaCl_____ 0.021
Exchange capacity, meq./g. wet wt_____ 0.54
Specific hydraulic permeability, in 0.01–0.1 N NaCl: $cm.^2$ $sec.^{-1}$ $dekabar^{-1}$_____ 6.9–10.6×$10^{-10}$ The second membrane, hereinafter referred to as membrane 2 was manufactured by the American Machine and Foundry Company and was a transparent, homogeneous membrane comprising a polyethylene matrix and a quaternary ammonium, or strong-base, anion-exchange type of polystyrene sulfonic acid and a major amount of a copolymer of vinyl chloride and acrylonitrile. For purposes of further comparison, typical data for collodion membranes are also included in the table.

*Table A*

| Membrane | Membrane Thickness, Mils | Solution | | Pressure p.s.i. | Percent Salt Filtered |
|---|---|---|---|---|---|
| | | Electrolyte | Normality | | |
| Example: | | | | | |
| I.—Membrane 1 | 3.5 | NaCl | 0.1 | 1,000 | 90 |
| II.—Membrane 1 | 3.5 | NaCl | 1.0 | 1,000 | 46 |
| III.—Membrane 1 | 3.5 | NaCl | 0.01 | 1,000 | 91 |
| IV.—Membrane 1 | 3.5 | $CaCl_2$ | 1.0 | 1,000 | 72 |
| V.—Membrane 2 | 6.3 | NaCl | 1.0 | 1,000 | 73 |
| VI.—Membrane 2 | 6.3 | $CaCl_2$ | 1.0 | 1,000 | 94 |
| Comparison Standard: | | | | | |
| 1. Commercial Membrane A | 24 | NaCl | 0.1 | 800 | 0 |
| 2. Commercial Membrane B | 30 | NaCl | 0.1 | 1,000 | 0 |
| 3. Commercial Membrane C | 30 | NaCl | 0.1 | 1,200 | 19 |
| 4. Commercial Membrane D | 4 | NaCl | 0.1 | 1,400 | 61 |
| 5. Collodion | [1] 1.2–2 | [2] $KIO_3$ | [2] 0.00084–0.09 | [2] 88 | [2] 40–05 |

| Membrane | Specific Hydraulic Permeability, $Cm.^2$ $Sec.^{-1}$ $Dekabar^{-1}$ | Exchange Capacity, Meq./g. wet wt. | Exchange Capacity, Sp. Hyd. Per. Ratio |
|---|---|---|---|
| Example: | | | |
| I.—Membrane 1 | $10.6 \times 10^{-10}$ | 0.54 | $5.1 \times 10^8$ |
| II.—Membrane 1 | $8.5 \times 10^{-10}$ | 0.54 | $6.3 \times 10^8$ |
| III.—Membrane 1 | $8.1 \times 10^{-10}$ | 0.54 | $6.7 \times 10^8$ |
| IV.—Membrane 1 | $6.9 \times 10^{-10}$ | 0.54 | $7.8 \times 10^8$ |
| V.—Membrane 2 | $2.2 \times 10^{-9}$ | 1.6 | $7.3 \times 10^8$ |
| VI.—Membrane 2 | $2 \times 10^{-9}$ | 1.6 | $8 \times 10^8$ |
| Comparison Standard: | | | |
| 1. Commerical Membrane A | $2.5 \times 10^{-5}$ | 1.3 | $5.2 \times 10^5$ |
| 2. Commercial Membrane B | $3.0 \times 10^{-6}$ | 2 | $6.6 \times 10^5$ |
| 3. Commercial Membrane C | $3.4 \times 10^{-7}$ | 2 | $5.9 \times 10^6$ |
| 4. Commercial Membrane D | $5.5 \times 10^{-9}$ | 0.77 | $1.4 \times 10^8$ |
| 5. Collodion | [3] $5.2–8.7 \times 10^{-6}$ | [1] 0.01–0.03 | $<1.2 \times 10^3–5.8 \times 10^3$ |

[1] U.S. Patent No. 2,636,851; exch. cap. given are total rather than effective ex. cap., and for dry wt.
[2] Erschler, B., Kolloid Z., 68, 289.
[3] Calculated.

polyelectrolyte. This membrane tested negative for sulfur and positive for chlorine. This membrane had the following characteristics:

Thickness, mils _____ 6.3
Conductance, in 1000 p.p.m. NaCl, millimhos/ $cm.^2$ _____ 1000
Transport number of Na+ in 0.3 N NaCl ____ 0.008
Permselectivity, 1.0/0.5 N KCl, percent _____ 92
Exchange capacity, meq./g. wet wt _____ 1.6
Specific hydraulic permeability, in 1.0 N NaCl: $cm.^2$ $sec.^{-1}$ $dekabar^{-1}$ _____ $2.2 \times 10^{-9}$ Electrolyte solutions subjected to the herein disclosed filtration process included sodium chloride solutions of 0.01, 0.1, 1.0 normality and a calcium chloride solution of 1.0 normality.

The results of the tests referred to above are presented in Table A below. For purposes of comparison there are also presented in Table A the results obtained by filtering 0.1 normal sodium chloride solution through various commercial membranes under conditions substantially identical to those described above. In the table commercial membrane A comprised a heterogeneous anionic membrane containing a major amount of a polyethylene binder and a minor amount of the hydroxyl form of a haloalkylated polystyrene cross-linked with divinylbenzene that had been quaternized with a tertiary amine. Commercial membrane B comprised a heterogeneous cationic membrane comtaining a major amount of a polyethylene binder and a minor amount of a sulfonated polystyrene cross-linked with divinylbenzene. Commercial membrane C was of similar chemical make-up as commercial membrane B. Commercial membrane D was a homogeneous cationic membrane comprising a minor amount From the data presented in the foregoing table it will be seen that excellent salt filtration is obtained with membrances having an exchange capacity to specific hydraulic permeability ratio in excess of $3 \times 10^8$, even in instances of very concentrated salt solutions. The foregoing data also demonstrate that improved salt filtering efficiency is obtained with an anion-exchange membrane when the predominant electrolyte to be filtered involves a multivalent cation and an anion of lesser valence than the cation. As explained previously, the converse is also true. Comparison of the specific hydraulic permeabilities and exchange capacities of the membranes of the examples with the corresponding values for the commercial membranes indicates that neither factor alone is responsible for the salt filtering properties of the membrane. Thus, commercial membranes A, B and C had exchange capacities several times as great as membrane 1 of Example I, yet membane 1 possessed substantially superior salt filtering properties. Similarly, commercial membrane D possessed a specific hydraulic permeability of substantially the same order of magnitude as membrane 2. Yet, membrane 2 exhibited susbtantially superior salt filtering characteristics.

Although the above-described filtrations were carried out in a single stage, it will be understood that the invention is not limited thereto and specifically includes filtration in a plurality of stages. As a matter of fact, filtration in a plurality of stages is especially advantageous, as desalting efficiency becomes greater for the more dilute solutions obtained from successive stages.

In another embodiment of the invention 1 normal aqueous sodium chloride solution is filtered in the apparatus described by compression at a pressure differential of about 1000 p.s.i. through the chloride form of a homogeneous membrane cast from a mutual solution in dimethylformamide of about 1 part by weight of 1-vinyl-3-methyl-imidazolium iodide and 2 to 3 parts by weight Dynel, a 40:60 copolymer of vinyl chloride and acrylonitrile having an exchange capacity of about 0.5 meq./g. and a specific hydraulic permeability of about $7 \times 10^{-10}$ cm.$^2$/sec./dek.

In still another embodiment, 1 normal aqueous sodium chloride solution is filtered in the apparatus described above by compression at a pressure differential of about 1000 p.s.i., through the sodium form of a homogeneous membrane comprising a film cast from a mutual solution of about 1 part polystyrene sulfonic acid (M.W.=approx. 30,000) and 2 parts Dynel in dimethylformamide, having a thickness of 48 microns, and having an exchange capacity of approximately 1.6 meq./cm.$^2 \times 10^3$, and a specific hydraulic permeability less than $1 \times 10^{-8}$ cm.$^2$/second/dekabar.

Obviously, the invention is not limited to the specific membranes described in the foregoing embodiments, and membranes of other chemical types and having other characteristics described herein can be substituted in the foregoing examples with good results. Nor is the invention limited to the specific apparatus, conditions, or steps disclosed in the foregoing embodiments.

By "specific hydraulic permeability" is meant the quantity of solvent in milliliters that will pass through a membrane cube having an edge length of 1 centimeter under a pressure gradient of 1 dekabar per centimeter per second (1 dekabar equals 10 bar). The specific hydraulic permeabilities set forth herein were measured without elimination of streaming potential by a suitable short-circuit arrangement. According to theory, the hydraulic permeabilities should be somewhat higher in the absence of a streaming potential. It is also noted that the specific hydraulic permeability of a membrane may vary somewhat in accordance with the filtration apparatus employed, the pressure, and also in accordance with the electrolyte concentration when it is determined with an electrolyte solution. Accordingly, it is important for the purposes of the ratio referred to herein that the specific hydraulic permeability be defined and measured as herein described, or in an equivalent fashion.

The expression "bar" is used herein in its usual sense to indicate the international unit of pressure equal to 14.504 p.s.i.

It will be understood that many modifications or variations of the herein described procedure may be resorted to without departing from the spirit and scope of the invention. Accordingly, only such limitations should be imposed thereon as are contained in the claims appended hereto.

We claim:

1. A process for deionization of an electrolyte solution comprising contacting a solution containing an electrolyte with one surface of an ion-exchange membrane having an exchange capacity:specific hydraulic permeability ratio in the range of about $3 \times 10^8$ to $1 \times 10^{10}$, and establishing a pressure differential between the surface of the membrane contacted by said solution and another surface thereof sufficient to force liquid of reduced electrolyte content through the membrane.

2. The process of claim 1 where the strength of the electrolyte solution is at least 0.1 normal.

3. The process of claim 1 where the membrane is a physically homogeneous membrane.

4. The process of claim 1 where the electrolyte in the solution involves a polyvalent cation and an anion of lesser valence and the membrane is an anion-exchange membrane.

5. The process of claim 1 where the electrolyte in the solution involves a polyvalent anion and a cation of lesser valence and where the membrane is a cation-exchange membrane.

6. The process of claim 1 where the deionization is carried out in a series of successive stages, and where the liquid forced through each successive membrane in the series is that forced through a preceding membrane in the series.

7. A process for deionization of an electrolyte solution comprising contacting a solution containing an electrolyte with one surface of a membrane having an exchange capacity:specific hydraulic permeability ratio in the range of about $3 \times 10^8$ to $1 \times 10^{10}$, an exchange capacity in the range of about 0.3 to 2.0 milliequivalents per gram wet weight, a specific hydraulic permeability in the range of about $5 \times 10^{-11}$ to $5 \times 10^{-8}$ per second per dekabar, said membrane being of a kind such that the fixed ions thereof are not selective for the ions in the solution and not selective for the dissociable ions of the membrane, and establishing a pressure differential between the surface of the membrane contacted by the solution and another surface of the membrane sufficient to force liquid of reduced electrolyte content through the membrane and in the range of about 75 to 15,000 p.s.i.

8. A process for deionization of electrolyte solutions comprising contacting a solution containing electrolyte with one surface of an ion-exchange membrane having an exchange capacity:specific hydraulic permeability ratio in the range of about $5 \times 10^8$ to $8 \times 10^8$, an exchange capacity in the range of about 0.5 to 2.0 milliequivalents per gram, a specific hydraulic permeability in the range of about $1 \times 10^{-10}$ to $2 \times 10^{-8}$ cm.$^2$ per second per dekabar, said membrane being of a kind such that the fixed ions thereof are not selective for the ions in the solution and not selective for the dissociable ions of the membrane, and establishing a pressure differential between the surface of the membrane contacted by the solution and another surface of the membrane sufficient to force liquid of reduced electrolyte content through the membrane and in the range of about 500 to 5,000 p.s.i.

9. The process of claim 8 where the active resin and the matrix resin component of the membrane is derived from a monomeric material having the generic formula $CH_2=C<$.

10. The process of claim 8 where the active resin component of the membrane contains a plurality of recurring quaternary ammonium groups and the matrix resin component of the membrane is polyethylene.

11. The process of claim 8 where the active resin component of the membrane contains a plurality of recurring quaternary ammonium groups and the matrix resin component is a copolymer of vinyl chloride and acrylonitrile.

12. The process of claim 8 where the active resin component of the membrane contains a plurality of recurring sulfonate groups and the matrix resin component of the membrane is polyethylene.

References Cited in the file of this patent

UNITED STATES PATENTS

| 1,825,631 | Horvath | Sept. 29, 1931 |
| 2,978,393 | Hoch | Apr. 4, 1961 |
| 2,987,472 | Kollsman | June 6, 1961 |

OTHER REFERENCES

Hober: "Membrane Permeability to Solutes in Its Relations to Cellular Physiology," Physiological Reviews, vol. 16, No. 1, 1936, pp. 71–72.

Breton: "Water and Ion Flow Through Imperfect Osmatic Membranes," Office of Saline Water Research and Development Progress Report No. 16 (pub. of U.S. Dept. Interior).

Wyllie et al.: Journal of Physical and Colloid Chemistry, vol. 54, February 1950, pp. 204–227.

Ellis: "Fresh Water From the Ocean," Ronald Press Co., New York, 1954, pp. 95–109.